United States Patent
Blodgett, Jr. et al.

(10) Patent No.: US 7,150,482 B1
(45) Date of Patent: Dec. 19, 2006

(54) SLIDE-OUT SYSTEM WITH ROLLERS

(75) Inventors: Raymond W. Blodgett, Jr., Norco, CA (US); Benjamin Fletes, Victorville, CA (US)

(73) Assignee: RBW Industries, Inc., Chino, CA (US)

( * ) Notice: Subject to any disclaimer, the term of this patent is extended or adjusted under 35 U.S.C. 154(b) by 0 days.

(21) Appl. No.: 10/920,556

(22) Filed: Aug. 17, 2004

Related U.S. Application Data

(60) Provisional application No. 60/496,960, filed on Aug. 18, 2003.

(51) Int. Cl.
*B60P 3/34* (2006.01)
(52) U.S. Cl. .................................. 296/26.13
(58) Field of Classification Search ................ 296/156, 296/164, 165, 168, 171, 172, 175, 176, 26.01, 296/26.12, 26.13; 52/67
See application file for complete search history.

(56) References Cited

U.S. PATENT DOCUMENTS

| | | | |
|---|---|---|---|
| 3,106,750 A | * | 10/1963 | Jarman ........................ 52/67 |
| 5,491,933 A | * | 2/1996 | Miller et al. ................... 52/67 |
| 5,577,351 A | * | 11/1996 | Dewald et al. ................ 52/67 |
| 5,791,715 A | | 8/1998 | Nebel |
| 6,108,983 A | * | 8/2000 | Dewald et al. ................ 52/67 |
| 6,293,611 B1 | * | 9/2001 | Schneider et al. .......... 296/171 |
| 6,619,714 B1 | * | 9/2003 | Schneider et al. ....... 296/26.13 |
| 6,729,669 B1 | | 5/2004 | McManus et al. |
| 2002/0180232 A1 | * | 12/2002 | Schneider et al. ....... 296/26.01 |
| 2004/0174031 A1 | * | 9/2004 | Rasmussen ............. 296/26.01 |

* cited by examiner

*Primary Examiner*—H Gutman
(74) *Attorney, Agent, or Firm*—Inskeep IP Group, Inc.

(57) ABSTRACT

A slide-out mechanism is provided that adjusts the elevation of a slide-out room relative to the main body of a vehicle. In one preferred embodiment, the slide-out mechanisms includes a tube roller mounted near the edge of the floor to slide vertically. The top end of the tube roller contacts the floor of the slide-out room while the bottom of the tube roller rolls along an extending arm. The extending arm includes a groove which allows the tube roller to reduce its vertical position when the slide-out is fully extended, causing the proximal end of the slide-out to therefore reduce in height.

22 Claims, 5 Drawing Sheets

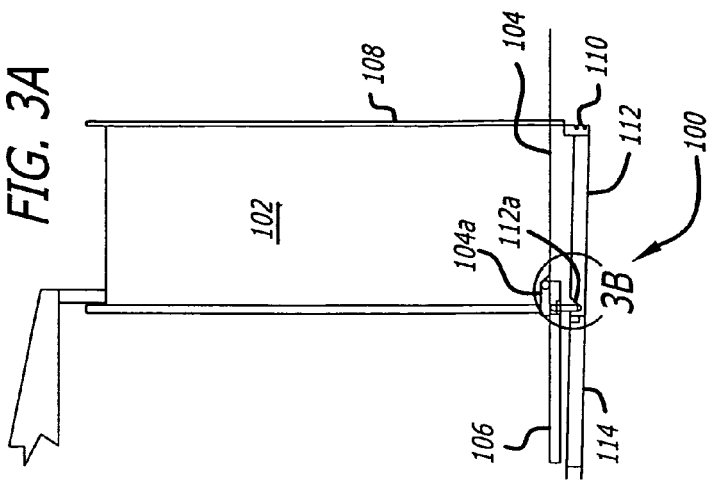
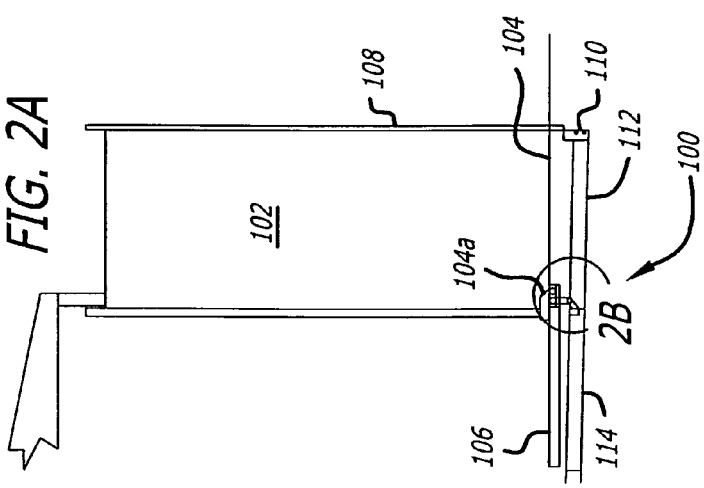
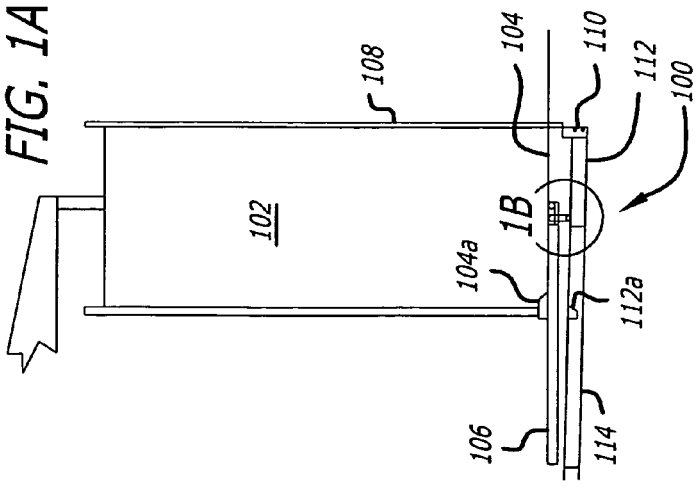

SLIDE-OUT SYSTEM WITH ROLLERS

CROSS REFERENCE TO RELATED APPLICATIONS

This application claims priority to U.S. Provisional Application 60/496,960, entitled Slide System with Floor Roller, Tube Roller, Latching Mechanism, filed Aug. 18, 2003 the entire contents of which are hereby incorporated by reference.

FIELD OF INVENTION

This invention relates broadly to slide-out rooms. More particularly, this invention relates to a mechanism for adjusting the elevation of a slide-out room typically used in travel trailers, fifth wheel travel trailers, motor homes, and other recreational travel vehicles.

BACKGROUND OF THE INVENTION

In order to increase the available interior space of a motorized or towable vehicle such as a motor home or trailer, these vehicles have been designed to include slide-out rooms. When the vehicle is in transit, the slide-out room is retracted and stored in the vehicle's interior with the exterior wall of the slide-out room approximately flush with the vehicle's exterior. As a result, there is typically adequate space within the vehicle's interior to accommodate users in transit and remain within the standard width limitations imposed upon a vehicle. When the vehicle is parked and leveled, the slide-out room is then slid outward through an opening formed in a sidewall of the vehicle thereby increasing the internal accommodations.

Typically, slide-out rooms include a floor section, a roof section, a first sidewall section, a second sidewall section, and a third sidewall section. In the retracted position, the roof section and the first and second sidewall section are concealed from exterior view, and the third sidewall section forms a portion of the vehicle's sidewall. At the same time, the floor section of the slide-out room typically rests above a floor section of a fixed room and may form a portion of the usable interior floor during vehicle transit. Similarly, the roof section of the slide-out room may define the interior ceiling of that part of the vehicle during transit. The proximal ends of the roof section, first sidewall section, and second sidewall section, include stop walls. As used herein, "proximal" refers to the portion towards the vehicle body and "distal" refers to the portion away from the vehicle body. The stop walls form an L-shaped configuration with the respective roof section, first sidewall section and second sidewall section. The stop walls engage the inner surface of a respective sidewall section of the fixed room when the slide-out room is fully extended, and thereby limit the travel of the slide-out room.

In the early phases of slide-out room design, the floor of the slide-out room would slide back and forth over the top of the interior vehicle floor. With these early designs, however, there would then always exist a step differential between the vehicle floor and the slide-out room floor, even when the slide-out room was fully extended. To some users, this type of design was inconvenient or unsightly.

As a result, later slide-out rooms were designed so that the slide-out room floor would become flush with the interior vehicle floor once the slide-out room was fully extended out from the vehicle. These designs become known as flush floor designs and examples of these designs can be found in U.S. Pat. Nos. 6,637,794, 6,598,354, and 5,577,351, each of which is hereby incorporated herein by reference.

However, even these later flush floor slide-out designs have not perfected the goal of achieving a flush floor configuration. For example, some existing flush floor slide-out designs are too complicated or cause excessive wear of parts over time. As a result, there is a continuing desire in the industry to find yet a better and more efficient way of achieving a flush floor configuration.

BRIEF SUMMARY OF THE INVENTION

It is an object of the present invention to overcome the limitations of the prior art and provide an improved way of achieving a flush floor configuration in a vehicle slide-out.

It is another object of the present invention to provide a slide-out mechanism that adjusts the elevation of a slide-out room.

It is another object of the present invention to provide a slide-out room that reduces its height when extended.

It is another object of the present invention to provide a slide-out room having a floor substantially level with a main floor of the vehicle body when in an extended position.

To achieve these and other objects not specifically numerated here, the present invention provides a slide-out mechanism that adjusts the elevation of a slide-out room relative to the main body of a vehicle. In one preferred embodiment, the slide-out mechanisms includes a tube roller mounted near the edge of the floor to slide vertically. The top end of the tube roller contacts the floor of the slide-out room while the bottom end of the tube roller rolls along an extending arm. The extending arm includes a groove which allows the tube roller to reduce its vertical position when the slide-out is fully extended, causing the proximal end of the slide-out to therefore reduce in height.

BRIEF DESCRIPTION OF THE DRAWINGS

FIG. 1A illustrates a side view of a slide-out mechanism according to the present invention;

FIG. 1B illustrates a side view of a roller of the slide-out mechanism shown in FIG. 1A;

FIG. 2A illustrates a side view of the slide-out mechanism shown in FIG. 1A;

FIG. 2B illustrates a side view of a roller of the slide-out mechanism shown in FIG. 2A;

FIG. 3A illustrates a side view of the slide-out mechanism shown in FIG. 1A;

FIG. 3B illustrates a side view of a roller of the slide-out mechanism shown in FIG. 3A;

DETAILED DESCRIPTION OF THE INVENTION

Figure 4A:
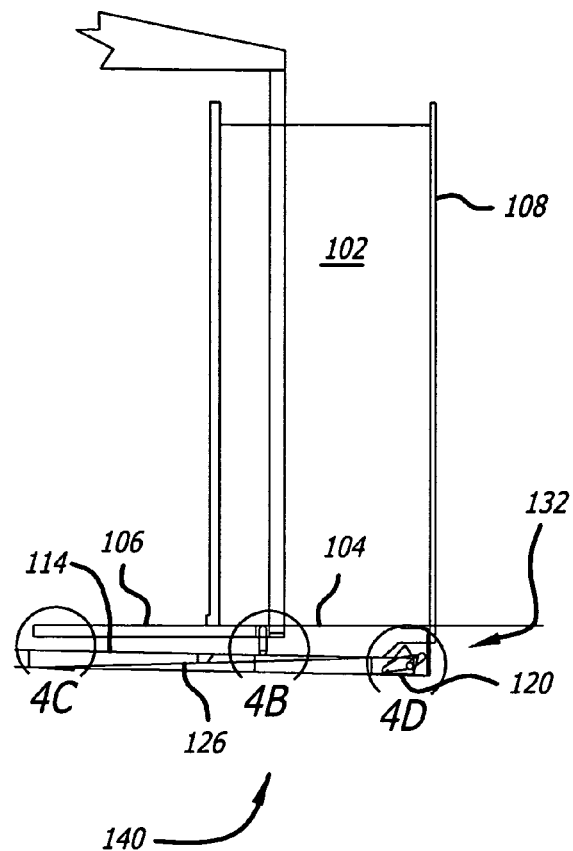
FIG. 4A illustrates a side view of a slide-out mechanism according to the present invention.
Figure 4B:
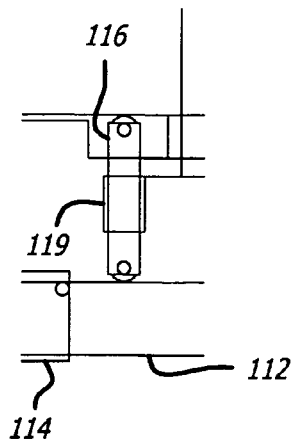
FIG. 4B illustrates a side view of a roller of the slide-out mechanism shown in FIG. 4A.

FIGS. 1A–3B illustrate a preferred embodiment of the slide-out mechanism 100 according to the present invention. The slide-out mechanism 100 allows a slide-out room 102 to extend from a vehicle and reduce its height when in a fully extended position. In the present embodiment, this is achieved with an extending arm 112 mounted at a downward angle and a tube roller 116 that lowers or raises the proximal end of the slide-out room 102. This arrangement allows the slide-out room 102 to extend and reduce in height so that the slide-out room floor 104 is flush with the main floor 106 of the vehicle.

The slide-out room 102 generally retracts and rests on the main floor 106 of the vehicle, partially supported by floor rollers 118, seen best in FIGS. 1B, 2B, and 3B. The slide-out room floor 106 contains upwardly ramped areas 104a positioned at the proximal end of the slide-out room 102. Each ramped area 104a has a width similar to or larger than the width of floor roller 118. Additionally, each ramped area 104a is aligned with each floor roller 118 (two or more floor rollers 118 are preferably included), allowing the proximal end of the slide-out room 102 to move downward in conjunction with a tube roller mechanism 116 described in more detail below. Optionally, the floor roller 118 may be replaced by a low friction pad, facilitating sliding movement of the slide-out room 102.

The slide-out mechanism 100 includes a fixed arm 114 mounted within the vehicle body, having a smaller extending arm 112 which telescopes outward from it. The distal end of the extending arm 112 is fixed to the underside of the slide-out room 102 by a bracket 110 which allows the extending arm 112 to push and pull the slide-out room 102 into an extended or retracted position. In this respect, the extending arm 112 may be coupled to a manual or motorized drive system to provide the force for extension and retraction.

The fixed arm 114, and therefore the extending arm 112, is mounted at a slight downward angle relative to the body of the vehicle. The downward angle is such that when the slide-out room 102 is fully extended, the distal end of the slide-out room floor 104 achieves an elevation that is level with the main floor 106. Therefore, as the extending arm 112 extends from the fixed arm 114, it pushes the distal end of the slide-out room 102 outwards and downwards at an angle. Thus, the slide-out room 102 remains substantially level in a retracted position and becomes angled as the slide-out room 102 is extended. However, note that when in a fully extended position the slide-out room 102 is once again substantially level, but overall lower in height, due to a tube roller 116 fixed to the vehicle body.

As best seen in FIGS. 1B, 2B, and 3B, the slide-out mechanism 100 includes the tube roller 116 (a cylinder shaped member having a roller bearing at either end), mounted to the vehicle body by a sleeve 119 within which the tube roller 116 moves vertically. Preferably, the sleeve 119 is positioned within an outer L shaped ledge on the main floor 106 of the vehicle. A top end of the tube roller 116 contacts and supports the slide-out room floor 104, while a lower end of the tube roller 116 contacts and rolls over the extending arm 112. Note that the L shaped ledge of the main floor 106 provides additional space for the slide-out room 102 to lower into when fully extended.

The extending arm 112 includes a ramped depression 112a, located at the same horizontal position as the proximal end of the slide-out room 102, as best seen in FIGS. 1A, 2A, and 3A. The tube roller 116 maintains a substantially uniform elevation as the slide-out room 102 is extended, until it reaches the ramped depression 112a. The tube roller 116 slides downward within the sleeve 119 as it rides down the ramped depression 112a. Since the tube roller 116 at least partially supports the slide-out room 102, the slide-out room 102 also reduces in height.

Preferably, the extending arm 112 and rollers 118 and 116 lower the slide-out room 102 so the slide-out room floor 104 is substantially level or flush with the main floor 106 of the vehicle. The height variation of the slide-out room 102 may be adjusted by increasing or decreasing the angle of the extending arm 112 relative to the vehicle, the depth of the ramped area 104a and the depth of the ramped depression 112a.

In operation, the extending arm 112 pushes the slide-out room 102 out from the vehicle, rolling on floor rollers 118 and tube roller 116, seen in FIGS. 1A and 1B. The slide-out room 102 extends further away from the vehicle in FIGS. 2A and 2B, while the extending arm 112 pulls the distal end of the slide-out room 102 at a downward angle. As the slide-out room 102 begins to reach a fully extended position, the floor rollers 118 follow the ramped areas 104a of the slide-out room floor 104, while the tube rollers slide downward along the ramped depression 112a of the extending arm 112. In this respect, the proximal end of the slide-out room 102 moves downward to a position level with the distal end while the slide-out room floor 104 moves to a position level or flush with the main floor 106 of the vehicle, seen in FIGS. 3A and 3B.

FIGS. 4A–7 illustrate another preferred embodiment of a slide-out mechanism 140 according to the present invention. The slide-out mechanism 140 is similar to the previously described slide-out mechanism 100, in that a ramped depression 112a on the extendible arm 112 allows the tube roller 116 to slide downward to reduce the height of the slide-out room 102. However, floor rollers and their accompanying ramped portions of slide-out room floor 104 are not included. Additional differences of the slide-out mechanism 140 include a latch mechanism 132 between the extendible arm 112 and the slide-out room 102 that releasably secures the height of the distal end of the slide-out room 102, as well as an extending arm 112 that extends at an angle level to the vehicle.

As previously stated, this embodiment of the slide-out mechanism 140 does not include floor rollers nor the associated ramped portions on the slide-out room floor 104. Typically, the slide-out room floors 104 are beveled to create ramped portions needed for flush floor conditions. However, by removing the ramped portions and floor rollers, it is possible to use simpler and cleaner square-cut edges on the floors.

Figure 4C:
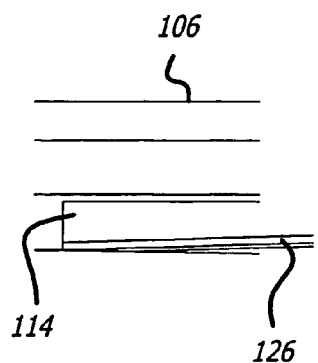
FIG. 4C illustrates a side view of a cable of the slide-out mechanism shown in FIG. 4A.
Figure 4D:
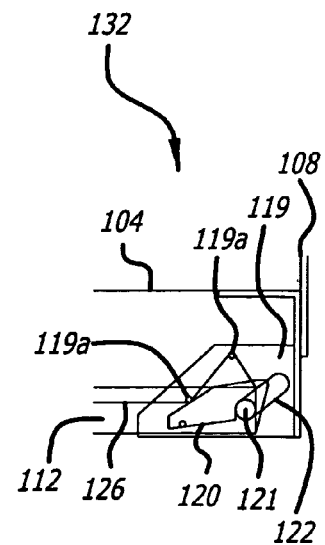
FIG. 4D illustrates a side view of a latch of the slide-out mechanism shown in FIG. 4A.

The slide-out mechanism 102 also includes a latch mechanism 132 which latches when the slide-out room 102 when in a retracted position to support the height of the distal end of the slide-out room 102 and unlatches when the slide-out room 102 is in an extended position to reduce the height of the slide-out room 102. As seen best in FIGS. 4D, 5D, 6D, and 7 the latch 132 includes a mount plate 119 fixed to a lower portion of the slide-out room 102, having an angled slot 122. A cross rod 121 is attached to the end of the extendible arm 112, extending through the slot 122, allowing it to slide back and forth within the slot 122. A latch 120 is pivotally mounted to the mount plate 119, having an inwardly curved region sized to accept the cross rod 121. When the cross rod 121 is slid to a proximal end of the slot 122, the latch 120 can latch onto the cross rod 121 to secure its position within the slot 122, as seen in FIG. 4D.

The position of the latch 120 is controlled by the tension of a cable 126 which is fixed to the latch 120 and the fixed arm 114. The cable 126 is positioned through the extendible arm 112 and attached to the fixed arm 114, as seen in FIG. 4C. Preferably, the cable 126 is mounted to a position on the fixed member 114 that allows the cable 126 to wrap around the end of the extending arm 112, thereby taking up at least some of the slack as the extendible arm 112 retracts.

Figure 5A:
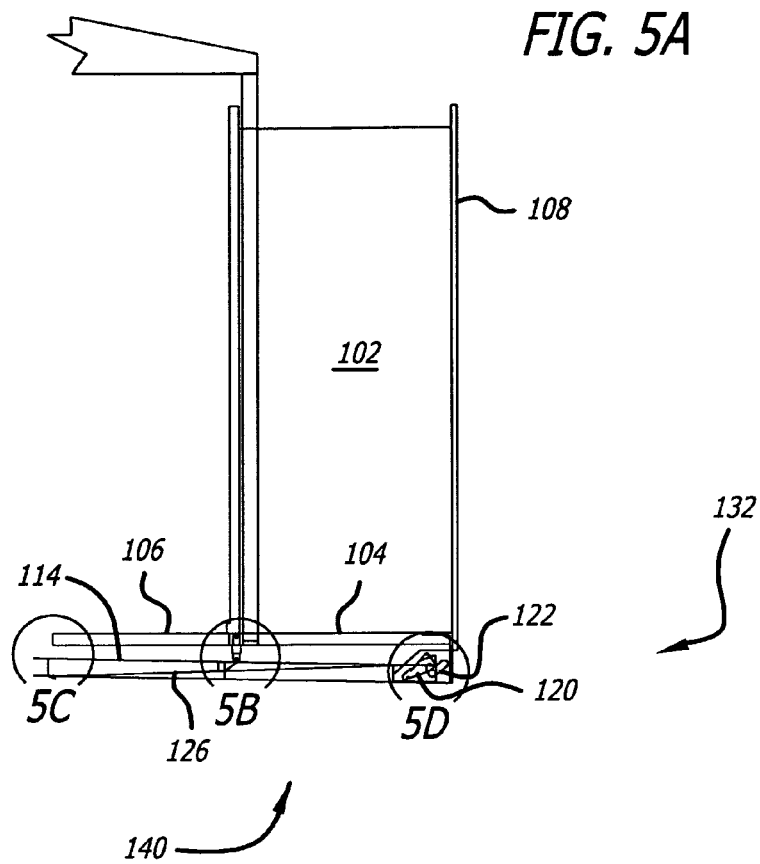
FIG. 5A illustrates a side view of a slide-out mechanism according to the present invention.
Figure 5B:
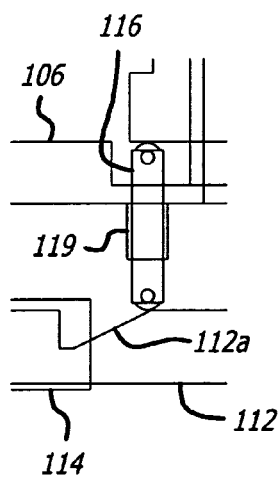
FIG. 5B illustrates a side view of a roller of the slide-out mechanism shown in FIG. 5A.
Figure 5C:
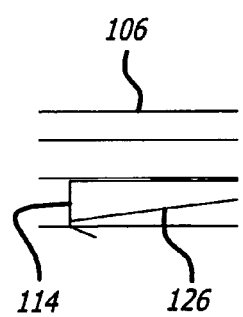
FIG. 5C illustrates a side view of a cable of the slide-out mechanism shown in FIG. 5A.
Figure 5D:
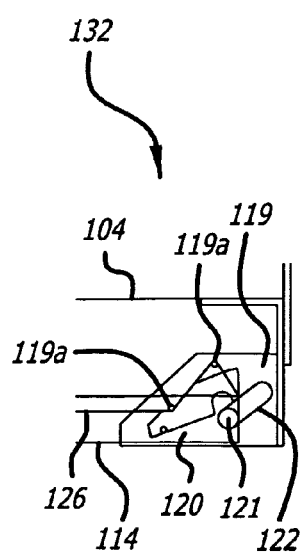
FIG. 5D illustrates a side view of a latch of the slide-out mechanism shown in FIG. 5A.
Figure 6A:
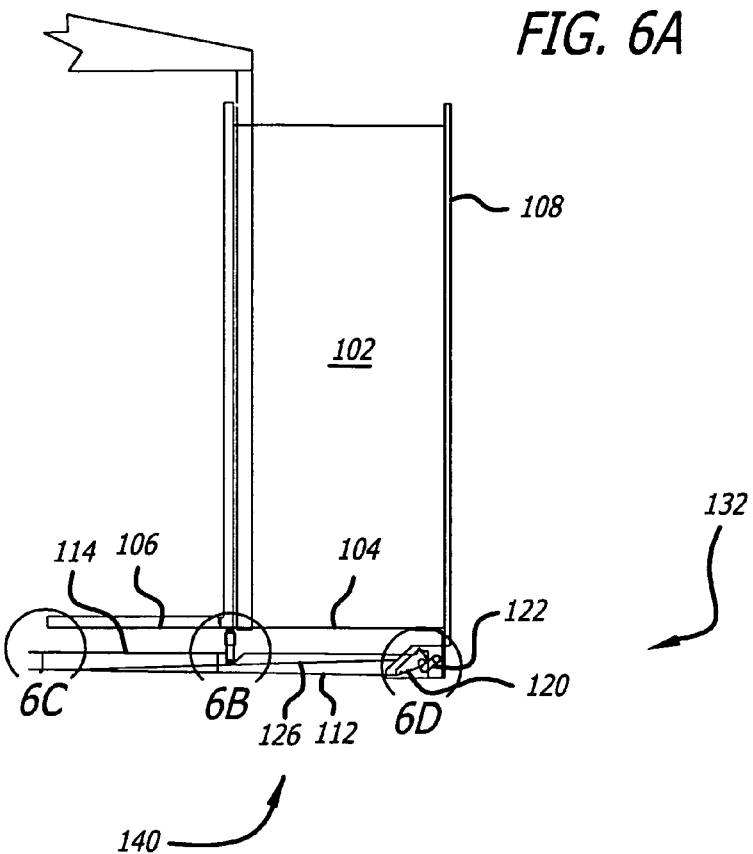
FIG. 6A illustrates a side view of a slide-out mechanism according to the present invention.
Figure 6B:
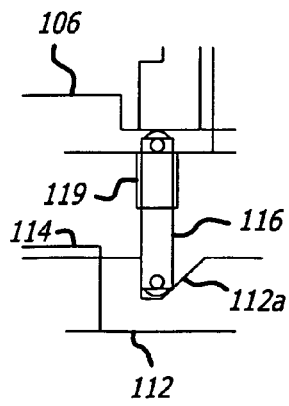
FIG. 6B illustrates a side view of a roller of the slide-out mechanism shown in FIG. 6A.
Figure 6C:
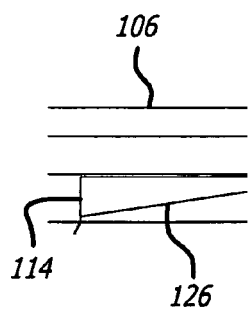
FIG. 6C illustrates a side view of a cable of the slide-out mechanism shown in FIG. 6A.
Figure 6D:
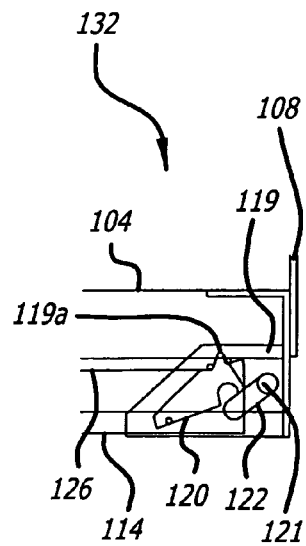
FIG. 6D illustrates a side view of a latch of the slide-out mechanism shown in FIG. 6A.
Figure 7:
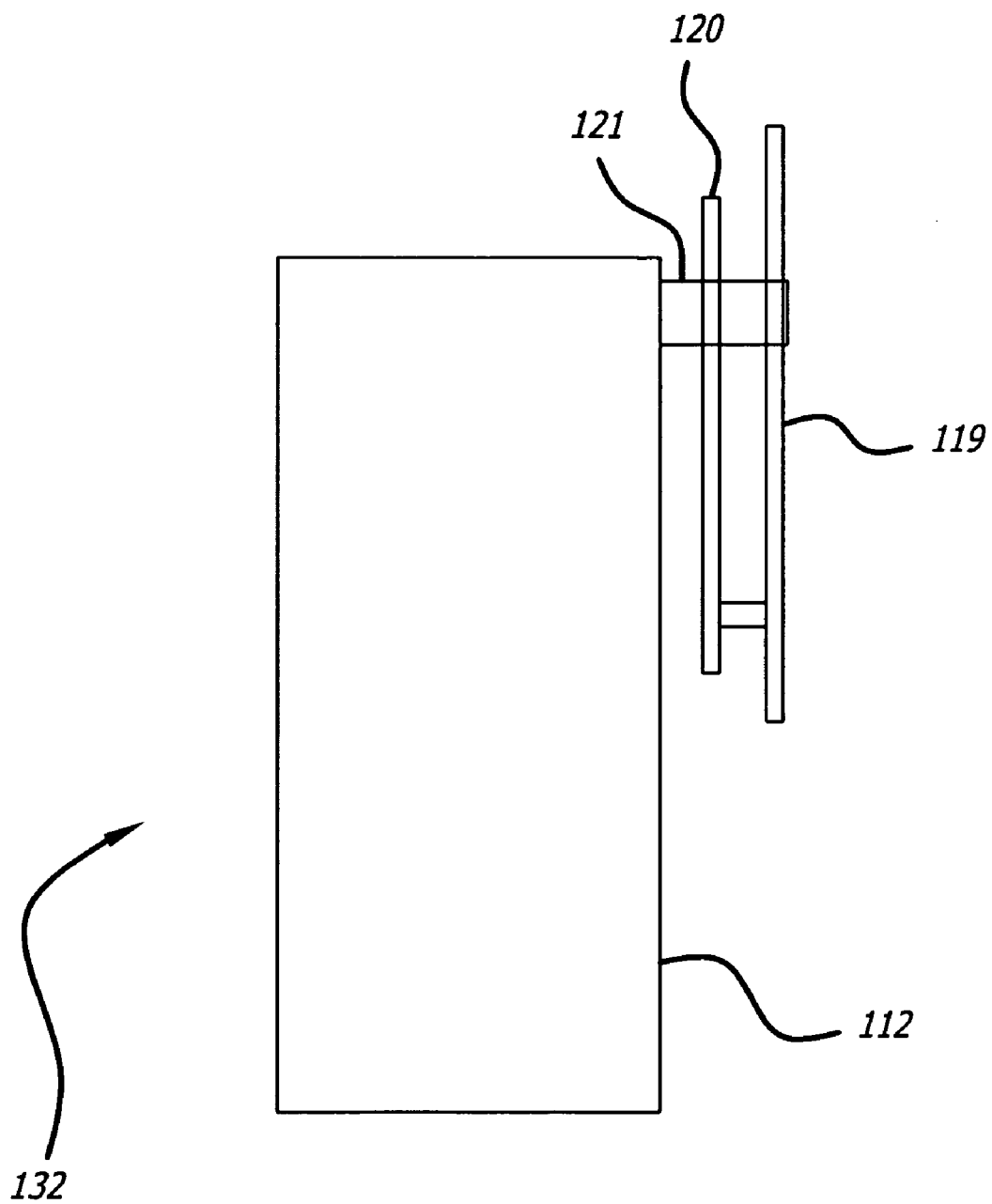
FIG. 7 illustrates a top view of the latch shown in FIG. 6D.

FIGS. 5C and 6C illustrate the cable 126 as the extending arm 112 is extended. The cable 126 is of a length such that the cable 126 is in tension when the extension arm 112 is moved to a fully extended position. As seen in FIGS. 4D, 5D, and 6D, the distal end of the cable 126 is positioned around two angling pegs 119a on the mount plate 119 and fixed to a distal end of the latch 120. This arrangement allows the cable 126 to apply or relieve force at an appropriate angle on the latch 120, raising or lowering it.

When the slide-out room 102 is in a retracted or partially retracted position (e.g. FIG. 4A), the tension of cable 126 low enough to allow the latch 120 to remain latched onto the cross rod 121, as seen in FIGS. 4A–4D. By remaining latched, the latching mechanism 132 maintains the distal end of the slide-out room 102 in a relatively elevated position, substantially even with the proximal end of the slide-out room 102. As the slide-out room 102 reaches its fully extended position, the cable 126 becomes tense, lifting the latch 120 off the cross rod 121, as seen in FIGS. 5A–5D. Once the latch 120 is lifted, the distal end of the slide-out room 102 lowers, allowing the cross rod 120 to move distally within slot 122, as seen in FIGS. 6A–6D. As a result, the distal end of the slide out room 102 lowers to about the same height as the proximal end. In this respect, the slide-out room floor 104 is level or flush with the main floor 106 of the vehicle.

Although the slide-out mechanism 140 preferably includes the cable 126 and latch 120, these items may be omitted to leave only the cross rod 121 and the mount plate 119 with slot 122. In this respect, the distal end of the slide-out room 102 may vary in elevation, but may not lock in place as with the latch 120.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A slide-out mechanism comprising:
a vehicle having a main floor and a side wall;
an opening for receiving a slide-out room disposed in said side wall;
a slide-out room slidably positioned within said opening and having a slide-out floor;
a moving member disposed on said vehicle at said opening and movable into and out of said vehicle, said moving member connected to said slide-out room;
a vertically movable bearing assembly interposed between a top surface of said moving member and a bottom surface of said slide-out room; and
said movable bearing assembly being vertically movable relative to said opening on said vehicle to lower said slide-out room floor to an elevation substantially level with said main floor of said vehicle as said slide-out room is approaching an extended position;
wherein said top surface of said moving member includes a depression for receiving said vertically movable bearing assembly as said slide-out room approaches said extended position.

2. The slide-out mechanism of claim 1 wherein said bearing assembly includes a bar vertically movable within a sleeve mounted to said vehicle.

3. The slide-out mechanism of claim 2, wherein said bearing assembly includes a tubular bar having a roller disposed on a top and a bottom end of said tubular bar.

4. The slide-out mechanism of claim 1, wherein said depression has a depth substantially equal to the distance required to lower said slide-out room to an elevation substantially level with said main floor.

5. The slide-out mechanism of claim 1, wherein said moving member extends at an angle relative to said main floor of said vehicle.

6. The slide-out mechanism of claim 1, further comprising at least one support roller disposed on said vehicle to support said slide-out room.

7. The slide-out mechanism of claim 6, further comprising a depression located in an underside bottom surface of said slide-out room surface, said depression sized to receive said roller as said slide-out as said slide-out room is approaching an extended position.

8. The slide-out mechanism of claim 7, wherein said depression is an angled depression.

9. The slide-out mechanism of claim 1, further comprising a bracket connecting said moving member to said slide-out room; said bracket connecting said moving member to said slide-out room through an elongated slot disposed on said bracket so as to allow movement of said slide-out room relative to said moving member.

10. The slide-out mechanism of claim 9, wherein said elongated slot is sized to allow vertical movement of said slide-out room relative to said moving member an amount substantially equal to the distance required to lower said slide-out room to an elevation substantially level with said main floor.

11. The slide-out mechanism of claim 10, further comprising a latch assembly disposed on said bracket, said latch assembly being movable between a latched position and an unlatched position, said latched position preventing any movement of said slide-out room relative to said moving member along said slot.

12. The slide-out mechanism of claim 11, wherein said latch is automatically movable between said latched and said unlatched position corresponding to a retracted and extended position of said slide-out room, respectively.

13. The slide-out mechanism of claim 1, further including a flexible member fixed to said latch assembly at one end and to said vehicle at an opposite end, said flexible member of a length to lift said latch assembly into said unlatched position when said slide-out is in a fully extended position.

14. A method of moving a slide-out room relative to a vehicle body comprising:
  providing a slide-out support member movable into and out of said vehicle body;
  providing a slide-out room connected to said support member;
  providing a bearing assembly on said vehicle body between said support member and said slide-out room;
  supporting said slide-out room at least partially on said bearing assembly;
  lowering said bearing assembly relative to said vehicle body as said slide-out room approaches an extended position out of said vehicle body; and
  lowering said slide-out room relative to said vehicle body and said slide-out support member.

15. A method according to claim 14, wherein the lowering of said bearing assembly includes lowering said slide-out room until a floor of said slide-out room is substantially flush with a floor of said vehicle body.

16. A method according to claim 15, wherein the lowering of said bearing assembly includes automatically lowering said slide-out room when said slide-out room approaches an extended position out of said vehicle body.

17. A method according to claim 14, wherein the providing of a slide-out support member includes providing said slide-out support member at an angle relative to said vehicle body.

18. A method according to claim 14, further comprising lowering of a distal end of said slide-out room at substantially the same time as the lowering of said bearing assembly.

19. A method according to claim 18, further comprising supporting a proximal end of said slide-out room with a stationary support mounted on said vehicle body during extension and retraction of said slide-out room.

20. A method according to claim 19, wherein the supporting of a proximal end of said slide-out room with a stationary support includes supporting said proximal end with a roller.

21. A method according to claim 14, further comprising latching said slide-out room in an upper position relative to said slide-out support member until said slide-out room approaches said extended position.

22. A method according to claim 21, further comprising unlatching said slide-out room from said slide-out support member as said slide-out room approaches said extended position, thereby allowing said slide-out room to lower into a position substantially flush with a floor of said vehicle.

* * * * *